United States Patent [19]
Brandt, Jr. et al.

[11] 3,844,529
[45] Oct. 29, 1974

[54] FLUID VALVE HAVING A PRESSURE RESPONSIVE INTERNAL MEMBRANE

[75] Inventors: Robert O. Brandt, Jr.; George V. Williams, both of Raleigh, N.C.

[73] Assignee: Brandt Industries, Inc., Raleigh, N.C.

[22] Filed: May 11, 1973

[21] Appl. No.: 359,533

[52] U.S. Cl. .............................................. 251/61.1
[51] Int. Cl. ......................................... F16k 31/145
[58] Field of Search ..................... 137/82; 251/61.1

[56] References Cited
UNITED STATES PATENTS

| | | | |
|---|---|---|---|
| 3,100,002 | 8/1963 | Moore | 251/61.1 X |
| 3,210,987 | 10/1965 | Bruns | 137/82 X |
| 3,490,479 | 1/1970 | Mott et al. | 137/82 |
| 3,605,781 | 9/1971 | Joesting | 137/82 X |
| 3,707,982 | 1/1973 | Hogel | 137/82 X |

*Primary Examiner*—Henry T. Klinksiek
*Attorney, Agent, or Firm*—Mills and Coats

[57] ABSTRACT

The present invention relates to a fluid valve having a plurality of openings extending to a main internal chamber formed therein, and a membrane extending across said internal chamber separating the internal chamber into upper and lower regions. The membrane is responsive to a pressure signal applied to one side thereof for restricting the flow of fluid from pressure supply through the region opposite the side of the membrane where the pressure signal is applied, giving rise to an increase pressure differential across the restricted area. Using the present valve as an amplifier, the high pressure area of the pressure differential is a linear amplification of the pressure input signal.

14 Claims, 3 Drawing Figures

PATENTED OCT 29 1974

3,844,529

FLUID VALVE HAVING A PRESSURE RESPONSIVE INTERNAL MEMBRANE

The present invention relates to valves, and more particularly to a fluid amplifying or control valve.

BACKGROUND OF INVENTION

In recent years, new areas of application in instrumentation and control systems have been found for fluid logic and control valves. Such fluid valves have been particularly popular and successful since they are compatible with low energy input signals and require relatively low levels of energy to operate, while functioning with substantial precision.

For the most part, fluid valves, and particularly pneumatic type fluid valves, whether used as a logic device or an amplifier, have been of the diaphragm type. In a valve of the diaphragm type the diaphragm deflects according to the pressure differential acting on the diaphragm plus any springs or other such extraneous forces acting in a direction parallel to the central axis of the diaphragm.

In order to operate reliably and successfully, it is necessary that the deflection of the diaphragm be minimized--generally not greater than one-third of the diaphragm thickness. To prohibit the diaphragm from over deflecting, one common practice is to use a material rigid enough to withstand substantial forces without significantly deflecting. Alternatively, or even in addition, provisions have been made in diaphragm type valves to feed back some of the pressure acting thereon to bring the entire diaphragm into balance.

The use of very rigid material for the diaphragm or the provision of a feed back system have serious disadvantages. If the material used for the diaphragm is very stiff and rigid, it follows that the undesirable effects of hysteresis and dead band are inherently present. Moreover, if the valves uses a pressure signal as a feedback to limit the deflection of the diaphragm, the final balance is dependent on the linearity of a nozzle or other type of restricting device used to feed the pressure signal back to the diaphragm in response to the deflection thereof. Since nozzles and flow restricting devices are inherently nonlinear, it follows that nonlinearity will be introduced into the response of the valve.

SUMMARY OF INVENTION

After much research and study into the above mentioned problems, a fluid valve has been devised that utilizes a free deflecting true membrane as the working member of the valve. The true membrane is slightly elastic initially, but beyond this the membrane is substantially nonelastic and will not withstand a significant bending moment, and is best exemplified by a material commonly known as a polyester film. Expressed in another way, a membrane is a prestretched film that resists further stretching but does not resist distortion of its shape that does not cause a change in the area of any portion of the membrane. With such a true membrane as the internal working member of the valve, there is relatively no hysteresis effect from the deflections and the valve does not rely on pressure feedback to balance the membrane. Instead, for proper operation, the membrane readily deflects and a stress balance of all portions of the membrane is realized.

By using a free deflecting, true membrane as the internal working member of the valve, it becomes possible to produce an output pressure that is a linear amplification of an input pressure signal. It has been possible, with stages, to have a linear 3-15 psig output pressure for 0-0.010 inch of water. Also, a linear 3-15 psig output pressure has been produced for a one degree Fahrenheit temperature differential.

Thus it is seen that the fluid valve of the present invention can appropriately be termed an amplifier. Such fluid amplifiers can readily be used in controllers, temperature transmitters, pressure transmitters, etc. The basic requirement of such a fluid amplifier is that the valve be capable of high accuracy and precision, low hysteresis, and capable of responding to a wide range of pressures. The valve of the present invention meets these requirements.

It is, therefore, an object of the present invention to provide a fluid valve that is capable of producing an output pressure that is a linear amplification of a selected input pressure signal.

More particularly, it is an object of the present invention to provide fluid valve as set forth in the above paragraph that is capable of responding linearly to relatively low input pressure signals.

A further object of the present invention resides in the provision of a fluid amplifying valve having disposed within a chamber formed therein a true membrane, said membrane being substantially nonelastic and unable to withstand a significant bending moment whereby undesirable hysteresis effects and feedback problems commonly associated with conventional disphragms is not encountered.

Still a further object of the present invention is to provide a fluid amplifying valve having a true membrane disposed internally therein with said membrane being only supported about the outer portions thereof and being disposed in a relaxed configuration.

A further object of the present invention is to provide a stress balancing membrane for a fluid amplifier wherein the membrane is not required to have springs or other such extraneous forces to bring the same into equilibrium when pressures are applied to each side thereof.

Moreover, a further object of the invention resides in the provision of a fluid amplifying valve that is simple and reliable and does not include parts that require total body movement.

It is still a further object of the present invention to provide a fluid amplifying device that is capable of producing a linear amplification for an input pressure signal wherein the amplification is independent of flow rate and supply pressure.

Other objects and advantages of the present invention will become apparent from a study of the following description and the accompanying drawings which are merely illustrative of the present invention.

DETAILED DESCRIPTION OF THE PREFERRED EMBODIMENT

Figure 1:
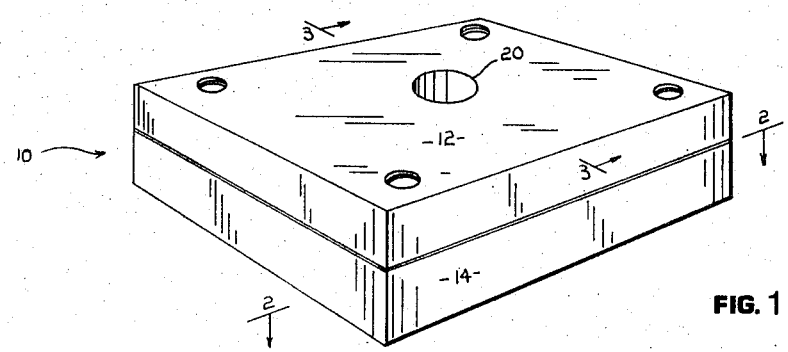
FIG. 1 is a perspective view of the fluid amplifying valve drawn in accordance with the present invention.
Figure 2:
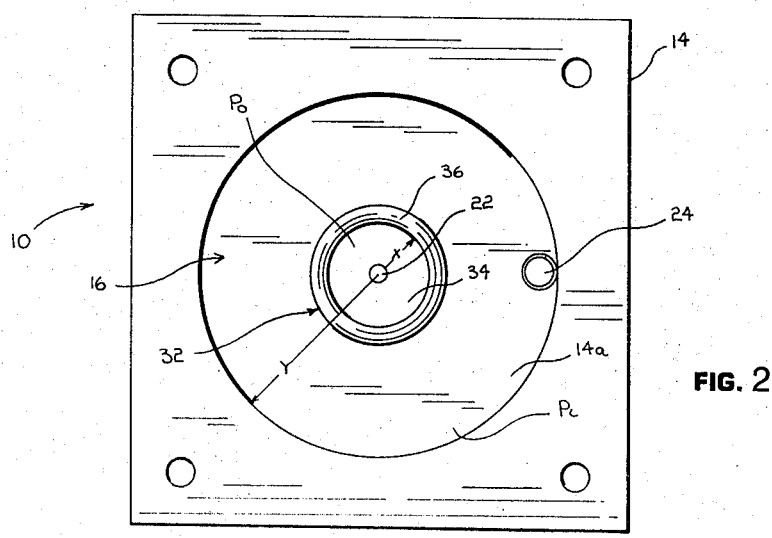
FIG. 2 is a top plan view of the lower plate of the fluid amplifying valve taken along lines 2—2 of FIG. 1.
Figure 3:
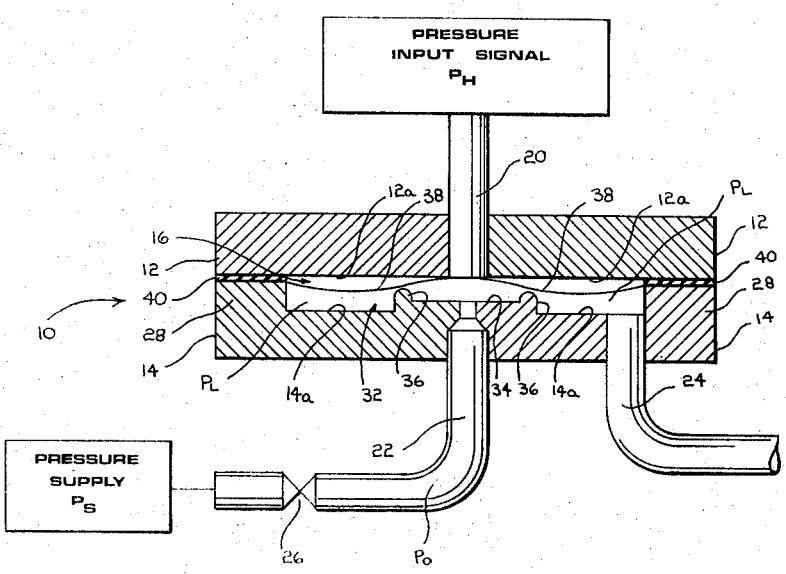
FIG. 3 is a cross sectional view of the fluid amplifying valve taken along lines 3—3 of FIG. 1.

With further reference to the drawings, the fluid amplifying valve of the present invention is shown therein and indicated generally by the numeral 10. Viewing fluid amplifying valve 10 in detail, it will be observed that the valve basically comprises upper and lower plates 12 and 14, respectively, said plates being secured together in opposed relationship by such means as screws being screwed into threaded openings formed within the valve body. As best seen in FIGS. 2 and 3, the lower plate 14 is recessed to form a main internal chamber 16 within the valve. Thus the internal chamber 16 is bounded above and below by upper plate innerface 12a and lower plate innerface 14a (FIG. 3).

Upper plate 12 has formed in the central portion thereof a pressure signal input opening 20 which, as indicated in FIG. 3, extends completely through the valve body 12 and is open to the main internal chamber area 16. Moreover, the pressure signal input opening 20 is adapted to be connected to a pressure input signal, $P_H$, and adapted to allow the pressure input signal to move therethrough into the main internal chamber area 16.

Lower plate 14 has integrally formed along the outer portions thereof a circular elevated collar 28 which is elevated relative to the inwardly adjacent recessed innerface 14a. As particularly illustrated in FIG. 2, the recessed innerfaced area 14a that lies inwardly of the collar 28 is generally flat and arcuately shaped. Disposed inwardly of the recessed innerface 14a is an elevated valve seat indicated generally by the numeral 32. The valve seat 32 comprises a central elevated base 34 that is disposed slightly above the level of the adjacent innerface 14a. Surrounding the elevated base 34 is an inner valve seat or circular fence 36. As again seen in FIG. 3, the top portion of the circular fence is generally convex and extends above the elevated base 34 to form the inner valve seat.

The lower plate 14 of the fluid valve 10 also includes a pair of openings 22 and 24 formed therein; each of said openings extending through the lower plate and open to the main internal chamber 16 formed between upper plates 12 and 14. Opening 22 is referred to as both a pressure supply inlet opening and a pressure out chamber. This double designation is appropriate since opening 22 is connected to a pressure supply, denoted $P_S$, through a flow restricting device 26. Consequently, a supply of fluid is channeled into the main internal chambers 16 of the valve through opening 22. Also, as will become apparent subsequently in this disclosure, the pressure in opening 22 will under certain conditions be an amplification of the pressure input signal, consequently opening 22 is termed a pressure out chamber, and as such is denoted $P_O$.

Separating the internal main chamber 16 of the valve into upper and lower regions is a relaxed imperviable membrane 38 preferably having a thickness of between 1/10th and 2 mills. The membrane 38 is held within the valve about the outer portions thereof between the collar 28 of the lower plate 14 and a generally circular resilient gasket 40 that is disposed between the membrane and the outer portions of the innerface 12a of the upper plate 12.

As particularly illustrated in FIG. 3, the membrane 38 assumes a concave-convex shape within the main internal chambers 16. It should be emphasized that the membrane 38 is characterized by true and genuine membrane properties and characteristics, as opposed to having properties and characteristics of a diaphragm. Genuine membrane properties and characteristics means that the membrane may slightly stretch intially but is substantially nonelastic, and is freely deflectable as the material will not withstand a significant bending moment. One particular material that has, for all practical purposes, true and geniune membrane properties and characteristics is a material commonly known as a polyester film. This film is commercially available under the tradename of Du Pont Mylar, Type A.

Although the fluid valve herein disclosed can be used as a check valve, a high or low select valve, or in other types of logic control valve applications, one principal application is that of a fluid amplifier where the valve acts to linearly amplify any of a given range of input pressure signals.

OPERATION

In operating as an amplifier, a pressure input signal, $P_H$, is directed through pressure input openings 20. The fluid associated with the pressure input signal, $P_H$, moves into the upper portion of the internal main valve chamber 16 and, as viewed in FIG. 2, exerts a downward force on the entire membrane 38. This downward force tends to push the membrane 38 downwardly toward the inner face 14a of plate 14.

Downward movement of the membrane 38 is resisted by the pressure acting on the bottom of the membrane. Therefore, the flow of fluid across the inner valve seat and through the internal chamber 16 of the valve tends to push the membrane back up. Because of the configuration of the valve and the particular places where the pressures are applied, it is seen that the membrane assumes the previously referred to concave-convex shape.

Although the downward movement of the membrane 38 is resisted by the flow of fluid through the lower area of the chamber 16, the net effect for an increase in the pressure signal is an increase in flow resistance between the inner valve seat 32 and the area of the valve outwardly thereof. This increase in flow resistance results in a greater pressure differential between the area defined inwardly of the valve seat 32 (which is $P_o$), and the area outwardly thereof, referred to as a low pressure area, $P_L$.

The increase pressure differential between $P_0$ and $P_L$ results in an increase in the pressure in the $P_O$ chamber. The pressure increase in $P_0$ does not have to be substantially great because the side walls of the valve can assist in supporting the increase pressure load applied from the pressure input signal.

But the increase pressure differential does cause the flow of decrease between the pressure supply, $P_S$, and opening 22 or the pressure out chamber. The smaller flow rate between the pressure supply and opening 22 causes the pressure differential between the pressure supply and opening 22 to decrease therefore giving rise to a further increase in the pressure $P_0$ in opening 22.

Thus, it is seen that pressure in the pressure out chamber $P_0$ increases because of the increase pressure differential across the inner valve seat 32 and because of the decrease in pressure differential between pressure supply and the opening 22. Also, it is appreciated that as $P_O$ increases due to the above reasons, the membrane 38 is pushed up against the pressure applied from the top by the pressure input signal, $P_H$. Thus, for an increase in pressure input signal, the membrane 38 tends to oscillate back and forth and is continually seeking an equilibrium or balance position.

It should be pointed out that an additional balancing effect is realized through a feedback force that is transmitted to the membrane 38 at the outer wall structure of the valve. This feedback force limits the movement of the membrane as it is attempting to reach its equilibrium position and this limiting force is very near the limitation required to bring the membrane in perfect equilibrium.

So therefore, it is seen that for a given input pressure signal, an output pressure, $P_O$, is produced that is a linear amplification of the particular input pressure signal applied to the valve. It has been found that the gain depends on the various perimeters of the valve which can be readily changed, thereby varying the gain.

Equations may be derived for defining the gain for any particular vale by assuming the membrane to be pliable and supported by the edges thereof. Such detail equations are not material to the present invention and can be readily derived by known mathematical procedures, but it can be stated that the gain is principally a function of the inner seat radius X and the outer radius Y, outer radius Y being the radial distance from the center of opening 22 to the inner edge of collar 28 as best seen in FIG. 2. Thus it can be stated that the gain is a function of the location of the inner and outer seats relative to the central axis of the membrane. However, the more sophisticated equations will indicate that gain is influenced by the height of the inner seat 32. But the seat height for all practical amplifying purposes and ranges is very small in relation to the principal variables that determine gain and consequently such does not materially effect the gain in amplifying valves such as those disclosed herein. But it should be emphasized that these equations will clearly show that the gain is independent of any flow rate or air pressure involved.

The terms "upper," "lower," "forward," "rearward," etc., have been used herein merely for the convenience of the foregoing specification and in the appended claims to describe the fluid valve having a pressure responsive internal membrane and its parts as oriented in the drawings. It is to be understood, however, that those terms are in no way limiting to the invention since the fluid valve having a pressure responsive internal membrane may obviously be disposed in many different positions when in actual use.

Th present invention, of course, may be carried out in other specific ways than those herein set forth without departing from the spriit and essential characteristics of the invention. The present embodiments are, therefore, to be considered in all respects as illustrative and not restrictive and all changes coming within the meaning and equivalency range are intended to be embraced herein.

What is claimed is:

1. A fluid valve comprising: a valve body having first and second plates secured together in opposed relationship to form a chamber therebetween; a pressure supplied inlet opening formed in said first plate and extending therethrough for channeling fluid from a fluid source into said chamber; a pressure supplied exit opening forming in said first plate and extending therethrough whereby fluid from said pressure supply may enter said valve chamber through said inlet opening and may exit through said exit opening; a pressure signal input opening formed within said second plate and extending therethrough; and an imperviable, freely deformable membrane means having geniune membrane characterists interposed between said first and second plates for positively amplifying input pressure signals received through said pressure signal input opening, said positive amplification being accomplished by restricting, but not completely blocking, fluid flow between said inlet an outlet openings in response to increases in pressure of the pressure signal applied to one side of said imperviable membrane means such that a pressure differential exists between said inlet and outlet openings with the higher pressure being a positive amplification of the particular pressure signal applied to said one side of said membrane means.

2. A fluid valve comprising: a valve body having first and second plates secured together in opposing relationship, at least one of said plates being recessed in order to form an open main internal valve chamber within said valve; a pressure out chamber formed within said first plates and open to said main internal valve chamber; a supply pressure operative to direct a fluid flow into said pressure out chamber; fluid flow restricting means connected between said supply pressure and said pressure out chamber for restricting the flow from said supply to said pressure out chamber; an exiting opening formed in said first plate and extending therethrough such that the fluid flow entering said pressure out chamber may exit through said exit opening; a pressure input signal opening formed in said second plate and extending therethrough for transmitting a pressure signal into said main internal valve chamber; and a thin, imperviable, freely deflectable membrane means having geniune membrane characteristics interposed between said first and second plates so as to separate said pressure input signal from said supply fluid flow for positively amplifying input pressure signals received through said pressure signal input opening, said positive amplification being accomplished by restricting; but not completely blocking, supply fluid flow between said pressure out chamber and said exiting opening in response to increases in pressure of the pressure signal applied to one side of said imperviable membrane means such that a pressure differential exists between said pressure out chamber and said exiting opening with the higher pressure being a positive amplification of the particular pressure signal applied to said one side of said membrane means.

3. The fluid valve of claim 2 including a slightly elevated generally circular inner seat formed about an inner face of said first plate adjacent said pressure out chamber, said inner seat being disposed on one side of said membrane means and cooperable therewith to restrict the fluid flow between said pressure out chamber and said exiting open.

4. The fluid valve of claim 3 wherein said membrane means is a polyester type film.

5. A fluid valve for amplifying an input pressure signal comprising:

a. A valve body comprising a pair of plates secured together in opposed relationship, each of said plates having an inner face with at least one inner face, being recessed to form a main internal valve chamber therein;

b. A pressure out chamber formed within one of said plates and open to said main internal valve chamber;

c. Fluid flow restricting means associated with said pressure out chamber for restricting fluid flow from a pressure supply to said pressure out chamber;

d. A generally circular seat formed about the inner face of said one plate adjacent said pressure out chamber such that fluid flowing through said pressure out chamber into said main internal valve chamber must move thereover, said circular seat being slightly elevated with respect to the adjacent surrounding inner face of said one plate;

e. A fluid exiting opening formed within said one plate and extending from the inner face therethrough whereby the fluid moving from said pressure out chamber into said main internal valve chamber may exit through said exiting open;

f. A pressure signal input opening formed within the other plate and extending therethrough for transmitting a pressure signal to the main internal valve chamber; and g. A thin, imperviable, relatively free deflecting membrane means having genuine membrane characteristics supported about the outer portions thereof between said plates and extending across said main internal valve chamber for positively amplying input pressure signals received through said pressure signal input opening, said positive amplification being accomplished by restricting, but not completely blocking, fluid flow between said pressure out chamber and said exiting opening in response to increases in pressure of the pressure signal applied to one side of said imperviable membrane means such that a pressure differential exists between said pressure out chamber and said exiting opening with the higher pressure being a positive amplification of the particular pressure signal applied to said one side of said membrane means.

6. The fluid valve of claim 5 including a generally flat circular area formed on the inner face of said one plate outwardly of said circular seat.

7. The fluid valve of claim 5 wherein said pressure out chamber and said pressure signal input opening are disposed in coaxial relationship and centrally located within said valve, and wherein said fluid exiting opening is radially spaced from said pressure out chamber and said pressure signal input opening whereby giving rise to a concave-convex shaped membrane means when balanced by opposing forces.

8. The fluid valve of claim 7 wherein said membrane means comprises a polyester film having a thickness less than two mills.

9. A fluid valve comprising: a valve body structure having a main internal chamber formed therein; means for transmitting a pressure signal into said main internal valve chamber; means for directing fluid from a pressure supply into said valve, through said internal chamber and back out said valve; and a thin, imperviable membrane means extending across said main internal chamber for positively amplifying pressure signals transmitted into said main internal chamber, said membrane means being supported about the outer portions thereof by said valve structure so as to separate the fluid associated with said pressure signal from the fluid associated with said pressure supply, said membrane means being substantially nonelastic and unable to withstand a bending moment and movably responsive to said pressure signal for restricting the flow of fluid from said pressure supply through said valve, consequently giving rise to a pressure differential across the restrictive areas of the valve wherein the higher pressure of the pressure differential being a positive amplification of the particular pressure signal transmitted into the internal valve chamber.

10. The fluid valve of claim 9 wherein said means for directing the fluid from a pressure supply into said valve includes a pressure out chamber extending through said valve and open to said internal chamber thereof, and wherein said pressure out chamber has associated therewith flow restricting means for restricing the fluid flow from said pressure supply thereto.

11. The fluid valve of claim 10 including a generally circular inner seat formed within said main internal valve chamber adjacent said pressure out chamber and disposed generally below said membrane for cooperating therewith to restrict the flow of fluid from said pressure out chamber into said main internal valve chamber.

12. The fluid valve of claim 10 wherein said means for transmitting fluid from a pressure supply back out said valve includes a fluid exiting opening formed within said valve and spaced from said pressure out chamber; and wherein said means for transmitting a pressure signal into said main internal valve chamber includes a pressure signal opening formed within said valve on the side of the membrane opposite said pressure out chamber and said exiting opening whereby the membrane reaches a balanced state due to the opposed forces of the pressure signal and the pressure of the fluid moving from the pressure out chamber through the internal main valve chamber which gives rise to a convexconcave membrane shape when a balanced state is reached.

13. The fluid value of claim 9 wherein said membrane is disposed in a relaxed wave configuration within said internal chamber with the surface area thereof being greater than the planar area across the same internal chamber.

14. The fluid value of claim 9 wherein said membrane is a polyester film.

* * * * *